Nov. 3, 1925.  
H. J. J. M. DE R. DE BELLESCIZE  
1,559,743  
RADIO RECEIVING SYSTEM  
Filed Aug. 29, 1921  2 Sheets-Sheet 1

Inventor  
H.J.J.M. De R. De BELLESCIZE  
By his Attorney

Nov. 3, 1925.

H. J. J. M. DE R. DE BELLESCIZE 1,559,743

RADIO RECEIVING SYSTEM

Filed Aug. 29, 1921   2 Sheets-Sheet 2

Inventor
H.J.J.M.DeR.DeBELLESCIZE
By his Attorney

Patented Nov. 3, 1925.

1,559,743

UNITED STATES PATENT OFFICE.

HENRI JEAN JOSEPH MARIE DE REGNAULD DE BELLESCIZE, OF PARIS, FRANCE.

RADIO RECEIVING SYSTEM.

Application filed August 29, 1921. Serial No. 496,533.

*To all whom it may concern:*

Be it known that I, HENRI J. J. M. DE R. DE BELLESCIZE, a citizen of France, and resident of Paris, France, have invented certain new and useful Improvements in Radio Receiving Systems, of which the following is a specification, accompanied by drawings.

The invention is an improvement over the one shown in my French Patent 506,142 and corresponding U. S. application No. 318,369 filed August 18, 1919.

The object of the present invention is—

(1) To remedy a practical difficulty encountered in connection with the system therein described.

(2) To extend the principle of the protection to the reception of continuous waves without a heterodyne.

Figure 1:
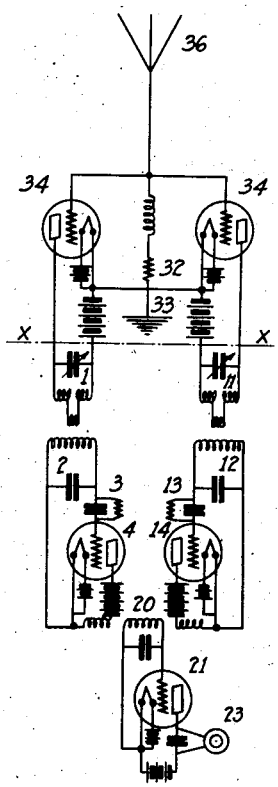

The circuit arrangement of Fig. 1 comprises two distinct receivers (1—2 and 11—12) each of which contains the same elements, and one receiver has no reaction on the other. One of the receivers is tuned to the wave that is to be received and the other receiver is detuned. Each receiver comprises a detector (3—4 and 13—14) which rectifies the oscillations.

The detected currents diffierentially energize one and the same low frequency circuit (20) which in turn actuates the telephone (23). This circuit arrangement may be used for receiving signals of modulated amplitude (musical waves or continuous waves received by means of the heterodyne wireless telephone signals, etc.).

The principle of the operation is a follows:

The oscillation generated by the signal is greater in the tuned than in the detuned receiver. The effect of one is therefore greater than that of the other and their opposition permits a sound to occur in the telephone. On the other hand, a sudden disturbance acting like a shock generates in both receivers oscillations of the same amplitude giving rise to detected currents of equal strength which mutually destroy each other by opposition.

The difficulty to be remedied is a follows:

In order to obtain satisfactory functioning, it is necessary that none of the high frequency resonators constituting one of the receivers react appreciably on any one of the resonators constituting the second receiver. This result may be secured by the use of two distinct open antennæ or two closed circuit frames, the connection of one opposing that of the other. The latter necessitates the insertion between each frame and the corresponding detector of a powerful high frequency amplifier. Experience shows that in practice it is very difficult to obtain two amplifiers composed of numerous stages that behave always in indentically the same manner in response to disturbing noises the amplitude of which is essentially variable. As a result of this, the opposing effect obtained by a circuit arrangement using amplifiers is not always perfect.

According to the present invention, this disadvantage is avoided by eliminating the amplification between the two resonators and the corresponding detectors and by preceding the resonators by a highly damped amplifier, the function of this amplifier being to increase to a sufficient value the amplitude of the waves to be received and at the same time preserve the aperiodic character of the disturbances.

Figure 2:
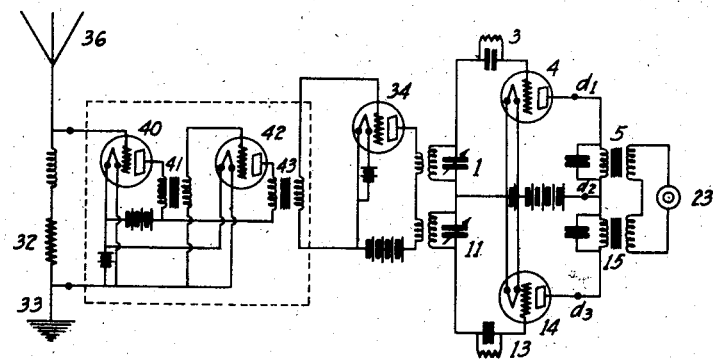

The invention is illustrated, by way of example, in the figures of the accompanying drawing, in which:

Fig. 1, shows one arrangement according to the invention,

Fig. 2, a modification thereof, and

Figure 3:
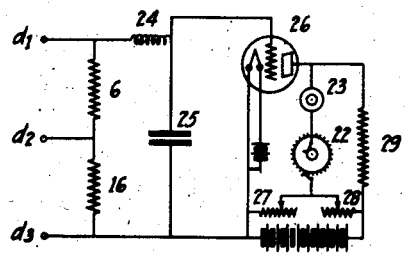

Fig. 3, a detail of a modification of the telephone circuit shown in Fig. 2.

The system in question (Figs. 1 and 2) is composed of an antenna, preferably open and of large dimensions (33—36) and damped by a resistance (32). This antenna serves simply as a collector and does not develop any phenomenon of resonance. If the amplitude of the signal is found insufficient, an aperiodic amplifier is inserted between the antenna and the resonators. The connection between the collector and the two groups of high frequency resonators is arranged in a manner to avoid the introduction of any important reaction between these two.

The circuit arrangement of Fig. 1 has been intentionally grouped in a manner to reproduce below the dotted line the arrangement of the basic circuit. The aperiodic collector is shown above the dotted line. It consists of the antenna (33—32—36) and two vacuum tube relays (34) each energizing one of the groups of high frequency resonators, (1—2 and 11—12). Thus it will be seen that there is no possible reaction between these two groups if the coils 1—2 and 11—12 are positioned in the proper direction, which may be easily accomplished.

Fig. 2 shows a simplified circuit arrangement comprising: the aperiodic antenna (33—32—36); an aperiodic amplifier (40—41—42—43), a single vacuum tube relay (34) connecting the collector to the two high frequency resonators (1 and 11), one being tuned to the wave to be received and the other detuned; a vacuum tube detector (3—4 and 13—14) for each resonator and two transformers (5 and 15) to effect opposition in the telephone 23.

The circuit arrangements shown in Figs. 1 and 2 are adapted for the reception of musical signals, heterodyne signals, or signals modulated as in wireless telephony.

The second object of the invention is to extend the principle of the protection against disturbances to the reception of continous waves without heterodyne reception.

If very long waves are received, the damped oscillations created in the two groups of resonators (1, 2, 11, 12) by the shock of a disturbance, attain a sufficient duration so that they will interfere with the heterodyne and will cause vibrations that cannot be completely eliminated by means of the opposition effect. It will be advisable to do away with the heterodyne and to replace (see Fig. 2) that part of the circuit that is connected to the terminals $d^1$, $d^2$, $d^3$ by the arrangement shown in Fig. 3.

This arrangement is analogous to the one described in the patent of the addition filed in France on December 13, 1920, No. 13,856 entitled "Differential circuit arrangement for low frequency resonators for eliminating aperiodic disturbances". The arrangement comprises two preferably adjustable resistances 6 and 16, in which potential drops are caused by the low frequency currents rectified in the detectors 3, 4 and 13, 14, these drops being equal if they are caused by disturbances and unequal if caused by a signal. Under the control of a signal generated between the grid and the filament of the tube 26 a certain difference of potential is produced the effect of which is to modify the interior resistance of the tube between the plate and the filament. This resistance constitutes one of the branches of a Wheatstone bridge the other branches of which are formed by the adjustable resistances 27, 28 and 29. The battery is connected into one of the diagonals of the bridge and the telephone 23 in series with the vibrator or ticket 22 in the other diagonal. It will be seen that the telephone does not give any sound when the bridge is balanced, i. e. when the potential drops are equal in the resistances 6 and 16 (normal position for disturbances), and that the telephone will be operated under the control of a signal which destroys the balance of the bridge. The difference of the ohmic drop in the resistances 6 and 16 affects the grid of tube 26, not directly but through the agency of a strong self induction coil 24, (about 1 henry) connected in series with a large capacity 25, (about 1 microfarad). Due to this arrangement, high frequency oscillations which may become superposed on the detected currents can have no access to the tube.

It should be understood that the different figures and the above description are only for the purpose of illustrating the invention and may be modified in a large number of ways without departing from the spirit of the invention.

Having described my invention, what I claim is:

1. In a system for eliminating disturbances in receiving radio signals, the combination of an aperiodic antenna, indicating means, a tuned and detuned receiver associated with the aperiodic antenna, said receivers being differentially associated with the indicating means.

2. In a system for eliminating disturbances in receiving radio signals, the combination of aperiodic collecting means, indicating means, a tuned and a detuned receiver coupled to the collecting means, associated with the indicating means with their effects in opposition thereon and substantially noninductively associated with each other.

3. In a system for eliminating disturbances in receiving radio signals, the combination of aperiodic collecting means, indicating means, a tuned and a detuned receiver coupled to the collecting means and associated with the indicating means with their effects in opposition thereon and aperiodic amplifying means between said collecting means and each of said receivers.

4. In a system for eliminating disturbances in receiving radio signals, the combination of aperiodic collecting means, a tuned and a detuned receiver coupled to the antenna, a detector circuit associated with each of said receivers and an indicator associated with each of said detector circuits with their effects in opposition.

5. In a system for eliminating disturbances in receiving radio signals, the combination of an aperiodic antenna, an aperiodic amplifier, a relay coupled thereto, a pair of receivers coupled to the output of said relay, one of said receivers being tuned and the other detuned, a rectifier connected to each of said last mentioned circuits and indicating means differentially coupled to the output of each of said rectifiers.

6. In a system for eliminating disturbances in receiving radio signals, the combination of aperiodic collecting means, a receiver resonant to the signal frequency and a receiver nonresonant to the signal frequency associated with the collecting means, a rectifier differentially connected to said receivers and an interrupter connected to the output of said rectifier.

7. In a system for eliminating disturbances in receiving radio signals, the combination of aperiodic collecting means, a receiver resonant to the signal frequency and a receiver nonresonant to the signal frequency, impedances connected to each of said receivers, a detector differentially associated with said impedances and means for interrupting the output of said detector at an audible frequency.

8. In a radio receiving system the combination of collecting means, a receiver resonant to signal frequency and a receiver non-resonant to signal frequency, impedances connected to each of said receivers, a rectifier differentially associated with said impedances and means for interrupting the output of said rectifier, said means comprising a three electrode tube having its input circuit associated with said rectifier and an interrupter connected in its output circuit.

9. In a radio receiving system the combination of collecting means, a receiver resonant to signal frequency and a receiver non-resonant to signal frequency, impedances connected to each of said receivers, a rectifier differentially associated with said impedances and means for interrupting the output of said rectifier, said means comprising a Wheatstone bridge circuit having one of its resistances varied by the output of said rectifier and an interrupter connected across said bridge circuit.

10. In a radio receiving system the combination of collecting means, a receiver resonant to signal frequency and a receiver non-resonant to signal frequency, impedances connected to each of said receivers, a rectifier differentially associated with said impedances and means for interrupting the output of said rectifier, said means comprising a Wheatstone bridge circuit having one of its resistances consisting of a three electrode tube with its grid circuit associated with the output of said rectifier and interrupting means connected across said bridge circuit.

HENRI JEAN JOSEPH MARIE de
REGNAULD de BELLESCIZE.